US009069241B2

(12) United States Patent
Walewski et al.

(10) Patent No.: US 9,069,241 B2
(45) Date of Patent: Jun. 30, 2015

(54) METHOD AND DEVICE FOR OPTICAL FOCUSING

(75) Inventors: Joachim Walewski, Unterhaching (DE); Michael Bahr, Munich (DE)

(73) Assignee: Siemens Aktiengesellschaft, Munich (DE)

(*) Notice: Subject to any disclaimer, the term of this patent is extended or adjusted under 35 U.S.C. 154(b) by 20 days.

(21) Appl. No.: 14/110,018

(22) PCT Filed: Mar. 28, 2012

(86) PCT No.: PCT/EP2012/055458
§ 371 (c)(1),
(2), (4) Date: Oct. 4, 2013

(87) PCT Pub. No.: WO2012/136523
PCT Pub. Date: Oct. 11, 2012

(65) Prior Publication Data
US 2014/0028742 A1  Jan. 30, 2014

(30) Foreign Application Priority Data

Apr. 7, 2011  (DE) .......................... 10 2011 006 985

(51) Int. Cl.
*G09G 5/02* (2006.01)
*G03B 21/53* (2006.01)
(Continued)

(52) U.S. Cl.
CPC ................ *G03B 21/53* (2013.01); *H04N 9/317* (2013.01); *H04N 9/3194* (2013.01); *G09G 5/10* (2013.01)

(58) Field of Classification Search
USPC ................... 345/204, 690, 694, 699; 359/625
See application file for complete search history.

(56) References Cited

U.S. PATENT DOCUMENTS

| 6,972,807 B2 | 12/2005 | Lee et al. |
| 2002/0113912 A1* | 8/2002 | Wright et al. .................. 349/13 |
| 2005/0094112 A1 | 5/2005 | Eguchi |

(Continued)

FOREIGN PATENT DOCUMENTS

| CN | 1414785 | 4/2003 |
| CN | 1695383 | 11/2005 |

(Continued)

OTHER PUBLICATIONS

Grundhofer A et al: "Dynamic Adaptation of Projected Imperceptible Codes", Mixed and Augmented Reality, 2007. ISMAR 2007. 6th IEEE and ACM International Symposium on, IEEE, Piscataway, NJ, USA, Nov. 13, 2007, pp. 181-190, XP031269894, ISBN: 978-1-4244-1749-0.

*Primary Examiner* — Ricardo L Osorio
(74) *Attorney, Agent, or Firm* — Cozen O'Connor

(57) ABSTRACT

A device for optically focusing a projection image projected by a projector includes a detector for controlled creation of at least one observation shot of the projection image over a time period, a processing unit for defining at least one image section within the projection image generated by the projector, where the image section is modulated over the time period with respect to the optical power and/or the optical spectrum thereof, and the at least one image section of the projection image is essentially synchronous compared with the corresponding respective image section of the observation shot, where the processing unit also calculates a variable derived from the comparison of the respective image sections and a control signal derived from the derived variable, and outputs the control signal to a focusing device of the projector.

15 Claims, 2 Drawing Sheets

(51) Int. Cl.
*H04N 9/31* (2006.01)
*G09G 5/10* (2006.01)

(56) References Cited

U.S. PATENT DOCUMENTS

2006/0187422 A1 8/2006 Inoue
2010/0328453 A1 12/2010 Kiesshauer
2014/0028742 A1* 1/2014 Walewski et al. .......... 345/694

FOREIGN PATENT DOCUMENTS

| | | |
|---|---|---|
| CN | 101377915 | 3/2009 |
| JP | 2009-124681 | 6/2009 |
| KR | 10 2007-00919 | 9/2007 |
| WO | WO 2010055625 | 5/2010 |

* cited by examiner

METHOD AND DEVICE FOR OPTICAL FOCUSING

CROSS-REFERENCE TO RELATED APPLICATIONS

This is a U.S. national stage of application No. PCT/EP2012/055458 filed 28 Mar. 2012. Priority is claimed on German Application No. 10 2011 0069 985.2 filed 7 Apr. 2011, the content of which is incorporated herein by reference in its entirety.

BACKGROUND OF THE INVENTION

1. Field of the Invention

The invention relates to a method and a device for optically focusing a projection image projected by a projector, and in particular for use in fixed image projectors or film projectors.

2. Description of the Related Art

Various technical methods for optical focusing are known from the prior art, where focusing occurs without intervention by an operator. Such methods are therefore often referred to by the term "autofocus".

Common autofocusing methods fundamentally provide methods that are based on a phase comparison and/or a contrast measurement of at least one object. In the latter methods, using contrast measurement, an image distance of an object varies, for example, until a measured contrast has achieved a maximum level. However, such contrast methods are only necessarily suitable for objects with a low contrast, i.e., objects or projections with a high proportion of monochrome and low-contrast background information, or with very little colour or grey contrast.

SUMMARY OF THE INVENTION

It is therefore an object of the invention to provide a method for optically focusing projected image information, which is to a great extent independent from the contrast of the projected image information.

This and other objects and advantages are achieved in accordance with the invention to providing a method and device in which, in order to optically focus a projection image projected by a projector, a detector is provided for the time-controlled creation of at least one observation shot of the projection image. The device in accordance with the invention furthermore comprises a calculating unit for the definition of at least one image region modulated at least over a time period with respect to its optical power and/or its optical spectrum, which image region is within the projection image generated by the projector, and for the substantially synchronous comparison of the at least one image region of the projection image with the corresponding respective image region of the observation shot. The calculating unit is furthermore configured to calculate a variable derived from the comparison between the respective image regions, as well as to calculate a control signal derived from this variable, and to output the control signal to a focusing device of the projector.

In accordance with an embodiment of the invention, the detector corresponds, for example, to an area detector with imaging optics, i.e., a charge coupled device (CCD) camera. The time-controlled creation of observation shots occurs, for example, over the time period.

The calculating unit in accordance with the invention defines, on the one hand, at least one image region modulated over the time period with respect to its optical power and/or its optical spectrum, which image region is within the projection image generated by the projector. This means, for example, that the projection image generated by the projector in an image region limited within the defined image region is superimposed with the image region defined by the calculating unit, such that the projection image generated by the projector in this image region is replaced by the image region defined by the calculating unit. With the currently typical digital projectors, this replacement corresponds to an easy-to-manage encroachment into the image data that defines the projection image.

The calculating unit in accordance with the invention is furthermore configured to perform a substantially synchronous comparison of the at least one image region of the projection image with the corresponding respective image region of the observation shot. A "corresponding" respective image region of the observation shot means that the modulated image region within the projection image generated by the projector is also determined on the observation shot, such that both compared image regions of the projection image, and the observation shot with respect to the projection image, have a largely identical local position and largely identical proportions.

The substantially "synchronous" comparison means that a temporal sequence of comparisons is carried out, where, at a specific point in time, the projection image defined at this point in time is compared to the observation shot of the projection image that is taken at essentially the same point in time.

The calculation unit is furthermore configured to calculate a variable derived from the comparison of the respective image regions, as well as a control signal derived from this variable, and to output the control signal to a focusing device of the projector.

A fundamental advantage of the method in accordance with the invention is achieved in that, in comparison to the prior art, the principle of a control loop is followed during optical focusing. By evaluating one or more image points which are known, on the one hand, with respect to their location and measurements and, on the other hand, have a modulation that is already known with respect to its optical power and/or its optical spectrum, focusing can be managed substantially more quickly and precisely than is the case in hitherto known measures.

A further advantage of the invention arises through a configuration of the measurement by means of at least one image region. The provision of a correspondingly dimensioned and located image region allows focusing during the imaging of a projection image that is desired as part of a presentation, without a specific test image, such as a line grid, having to be attained for the projection.

In accordance with a first embodiment of the invention, a definition of exactly one image region of the projection image is provided and, correspondingly, a comparison with exactly one corresponding image region of the observation shot is provided. The variable derived from the comparison of the respective image regions is determined as the signal-to-noise ratio (SNR). The noise can be measured before or during the autofocusing process. Here, a suitable measured value for the noise is the standard deviation of the intensity value of unmodulated image points (pixels) for a measurement that is repeated several times. For the focusing, it is also possible to leave suitable values in the memory of the calculating unit. Furthermore, when the pixel noise is too small, this can be artificially increased. To that end, the pixels to be evaluated are modulated with a random amplitude. Expressed in optical categories, the SNR thus corresponds to the dynamic contrast. This first embodiment of the invention has the advantage of a relatively low calculation effort when there is a fast convergence of the autofocusing method irrespective thereof.

In accordance with a preferred second embodiment of the invention, a definition of at least two image regions of the projection image are provided, which are each modulated over the time period with respect to their optical power and/or their optical spectrum. Accordingly, a respective synchronous and, in certain embodiments, an independent comparison of the image region of the observation shot that corresponds to the respective image region of the projection image with the respective image region of the projection image is provided. The second embodiment of the invention provides the advantage of conducting the method in accordance with the invention with only a slightly increased calculation effort which, however, is compensated for by the advantage of a more precise and faster convergence of the focusing measures. Performing the method by using several image regions creates the advantage of a comparable calculation, the effects of which are negligible, which are unnecessary with the target of optical focusing for a calculation of the variable derived from the comparison of the respective image regions. Examples of these negligible effects are the properties of the optical transmission channel and specifics about the optical elements of the projector.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

An exemplary embodiment with further advantages and embodiments of the invention is illustrated in greater detail below with the aid of the figures in which.

DETAILED DESCRIPTION OF THE PREFERRED EMBODIMENTS

Figure 1:
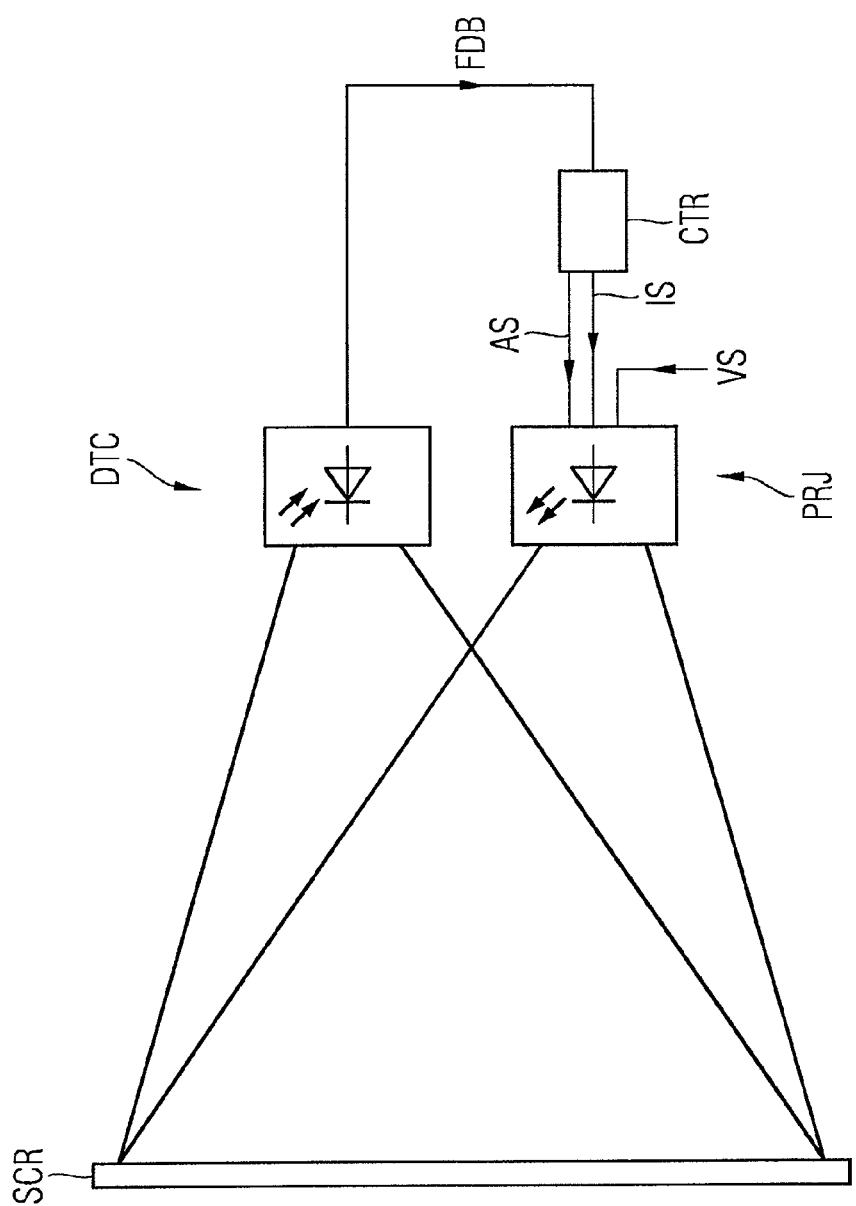
FIG. 1 is a structural image for the schematic depiction of a device for the optical focusing of a projection image projected by a projector.

FIG. 1 shows an exemplary embodiment of the invention, having a projector PRJ for projection of a projection image onto a projection screen SCR. The image data VS to be depicted on the projection screen by the projector is supplied via, for example, an external computer (not shown) via an interface of the projector PRJ.

A calculating unit CTR defines at least one part of the projection image generated by the projector PRJ comprising focusing image data IS, which is supplied by the calculating unit CTR to the projector PRJ. To implement one embodiment of the focusing method in accordance with the invention, two image regions modulated over a time period with respect to their optical power are defined within the projection image generated by the projector PRJ.

This definition has the consequence that the projection image generated by the projector PRJ is replaced in an image region limited within the defined image regions by the image region defined by the calculating unit SCR. In the digitally operating projector PRJ, this definition occurs by using the focusing image data IS provided by the calculating unit CTR for the defined image regions instead of the image data that was originally provided by the projector PRJ.

To create observation shots, a detector DTC is provided, where a respective observation shot records the projection image as a complete image or a partial image. The detector DTC is, for example, implemented by an area detector having imaging optics, which can generate successive observation shots from the projected image with at least five-millisecond time resolution and lag. To that end, the detector is configured onto the projection screen SCR.

The image content FDB of the observation shot, of exact, spatially resolved measured values from the observation shots, is transferred from the detector DTC to the calculating unit CTR in accordance with a control loop principle of feedback.

The image content FDB of the observation shot is compared within the calculating unit CTR and a variable derived from the comparison of the respective image regions is determined. From this derived variable, a control signal AS is generated, which is transferred to a focusing device (not depicted) of the projected PRJ, such as a multiphase motor for adjusting the object.

Thus, the calculating unit CTR can be located logically before or, as depicted here, logically after the feedback channel FDB. The proposed autofocusing method functions best for focusing mechanisms that only vary an independent variable, such as the distance between light source and imaging optics of the projector.

It should be understood that the invention is also to be implemented in alternative projection variants, such as by using rear-projection technology or even with screen technology. For the screen technology, the functions of the projection screen SCR and the projector SCR are fused into an actively activatable screen SCR.

It should also be understood that the disclosed embodiments of the invention can be implemented such that the control unit SCR and the projector PRJ comprise a single functional unit, where the entire image content of the projection image, including the image region provided in accordance with the invention, is defined by the control unit of this projector.

Furthermore, in the context of the disclosed embodiments of the invention, embodiments are to be implemented in which either a continuing separation of the PRJ from the detection unit DRC or a continuing integration of the functional units is provided.

An embodiment with a continuing separation comprises a separate device, such as a mobile unit comprising a personal digital assistant (PDA), with an optical creation unit, which is suitable for wireless communication with the control unit CTR of the projector PRJ. In synchronicity with the specifications of the control unit CTR, observation shots are transferred to the control unit CTR via wireless data feedback FDB. In one particular embodiment, the shifting of the calculations is also to be implemented by the computing unit CPU on this mobile unit.

An embodiment with a continuing integration of the projector PRJ with the detection unit DTC comprises arrangements in which both components cited are integrated in the same device.

The modulation method used in accordance with the invention is based on dynamically modulating image regions of the projected image that are adjacent to one another or close to one another. The spatial dimensions of the image regions can, apart from that, be selected in any way. According to the quality of the optics used in the projector PRJ and in the detector DTC, the lower dimension of the image regions is only limited by the pixel resolution. With a corresponding selection of the optics, a respective image region can therefore also extend above a single pixel. The spatial dimensions of the image regions are only limited at the top by the dimensions of the projection image.

For the modulation method, the optical power transmitted per image region is, for example, modulated in line with a constant modulation index. Both image regions are modulated with the same waveform, yet with a phase difference of π, such that two opposed, modulated image regions arise, which pass through various light intensities in an alternating sequence. In an alternative embodiment of the invention, spectrum modulation occurs, where various colour values are passed through.

If the integrated signals are numerically subtracted from both regions, there arises a difference signal whose amplitude increases as the image focus improves.

The calculation of the variable derived from the comparison of the respective image regions thus occurs such that the optical power of a first image region and a second image region are each spatially integrated and the integrated optical power of the first image region is subtracted from the integrated optical power of the second image region. The derived variable increases as the image focus improves. Accordingly, the control signal AS is adjusted such that an increase in the derived variable is achieved.

The modulation frequency is preferably adjusted such that it lies outside of the perception range, thus, for example, above the sampling frequency of the projector.

The modulation frequency is furthermore preferably adjusted such that it lies outside of the range for photosensitive epilepsy, i.e., greater than 70 Hz.

The frequency with which the observation shots are taken is preferably an integral multiple of the modulation frequency.

The observation shot is preferably synchronised with the modulation frequency. To that end, standard methods from communications engineering can be used.

In accordance with another embodiments of the invention, only the connected pixel regions are modulated, so as to configure the evaluation of the observation shot as simply as possible.

In another embodiment of the invention, respective edges of the image regions are rendered identifiable by a vastly different modulation. If a modulation frequency f is selected, a modulation of the edges with another modulation frequency occurs, such as with a value f/2 amounting to half the modulation frequency.

In accordance with another embodiment of the invention, all regions are modulated with Code Division Multiple Access (CDMA) keys and a different key is used for the edges from that which is used for the focusing ranges themselves.

Advantageous modulation formats are part of the family of pulse-amplitude modulation. Examples of this are sine modulation and On-Off Keying (OOK).

In another embodiment of the invention, the signal of a respective image region is summarized before being evaluated. Among other things, this has the advantage that intrinsic pixel noise, for example, a quantisation noise in the CCD (Charge-Coupled Device) of the detector DTC, is minimised.

In another embodiment of the invention, only those regions of the projection image that still allow modulation are selected, i.e., regions whose modulation level is still not saturated.

In a further embodiment of the invention, spatial oversampling of the recording shot is performed. Here, at least two sampling points are set in each modulated image region.

If the projection image has uncontrolled flickering which, for example, can be caused by a resonance with the AC voltage supply, it is advantageous to only perform the modulation and observation shots sporadically. It is thus advantageous to perform the modulation and observation shots at randomly selected points in time. It is also advantageous to average the measured signals from several measurements. Finally, it is above all recommended to have relatively static image contents, such as film presentations.

However, in the case of dynamically altered image contents, in accordance with an alternative embodiment of the invention, intensity normalisations are performed. Here, the intensity of the modulated image regions within a reference region is selected or adjusted. For example, temporal phases of modulation and non-modulation can be in close succession to each other, where the measured value for the non-modulation phases is consulted for the normalisation. One alternative to this is to consult the peak value during a modulation phase for the normalisation. A further alternative involves spatially limited regions that have a structure and illumination that are as similar as possible to the modulation region. Overall, it is advantageous to evaluate only the respective normalised values for each region.

It is furthermore advantageous to adapt the variable of the modulated image regions to the focal adjustment. When there is unfocused adjustment, the image regions are to be selected as relatively large, but for focused adjustments, the image regions are to be selected as relatively small.

Moreover, at the beginning of the focusing, the present focused adjustment is determined by an iterative reduction in the modulation regions. Here, the modulation regions are reduced in a strictly monotone manner until the contrast between two modulation regions or, when only one modulation region is used in accordance with an alternative embodiment of the invention, between the modulation region and the noise, is again reduced. The region adjustment before this reduction is then the optical region adjustment for a further focusing.

When performing focusing, it is advantageous to measure the contrast at several successive focus adjustments and determine the maximum value from the curve determined thereby. This can occur by interpolation or selection of the closest focal point.

If required, a region of the projected image can be selected, which is to be optimally focused, such as a complex diagram that is to be depicted.

The proposed modulation can be performed with one or more of the elementary colours used for the projection. In this latter case, it should be ensured that the colour focus of each modulated pixel is retained.

It is also possible to perform the disclosed embodiments of the method in accordance with the invention with invisible light, such as in the infrared range, and to apply the method in dark areas for CCTV cameras.

Moreover, when there is modulation of only one colour, it is expedient to take the observation shot with an adapted optical filter.

The disclosed embodiments of the invention thus enable autofocusing of projected static or moving images during a presentation. To that end, no test image is necessary, i.e., the autofocusing can be performed directly with the image to be used. The disclosed embodiments of the invention particularly enable focusing of low-contrast images.

Furthermore, an advantageous use of the disclosed embodiments of the invention is possible with shaking projectors, such as with hand-held projectors.

The dynamic focusing enabled by the disclosed embodiments of the invention is of increasing significance as projectors become smaller and more energy-efficient, such that these can be intensely influenced by changing environmental conditions such as room temperature.

Figure 2:
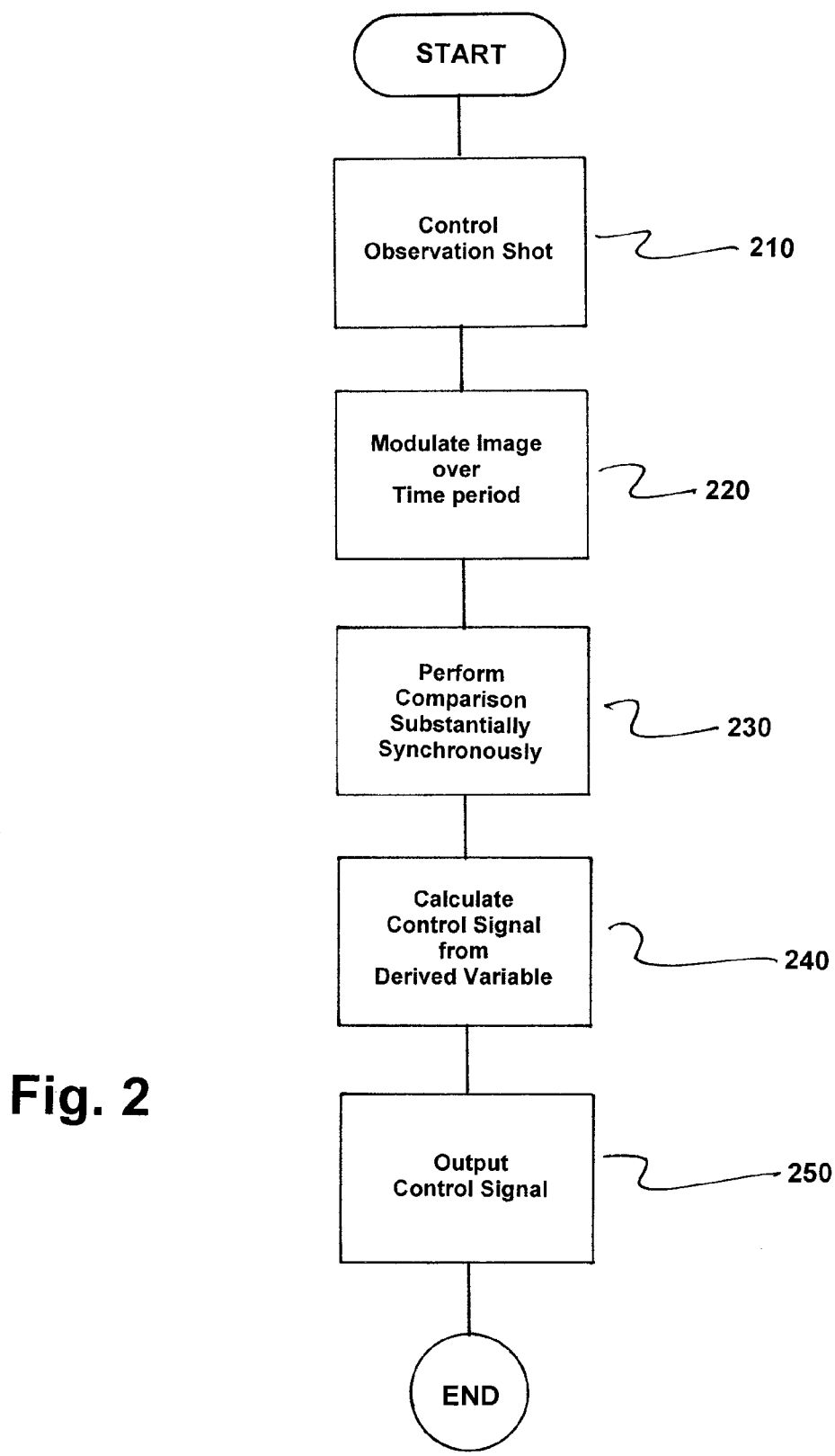
FIG. 2 is a flowchart of the method in accordance with the invention.

FIG. 2 is a flowchart of a method for optically focusing a projection image projected by a projector. The method comprises controlling the creation of at least one observation shot of the projection image over a time period, as indicated in step 210.

Next, at least one image region modulated over the time period with respect to at least one of (i) an optical power of the at least one image region and (ii) an optical spectrum of the at least one image region is defined, as indicated in step 220. Here, the at least one image region is within the projection image generated by the projector.

The at least one image region of the projection image and a corresponding respective image region of an observation shot are now compared substantially synchronously, as indicated in step 230.

Next, a variable derived from comparisons of respective image regions is calculated and a control signal derived from the derived variable is calculated, as indicated in step 240.

The control signal is then output to a focusing device of the projector, as indicated in step 250.

While there have been shown, described, and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A device for optically focusing a projection image projected by a projector, comprising,
    a detector for time-controlled creation of at least one observation shot of the projection image; and
    a calculating unit configured to:
        define at least one image region, modulated with respect to at least one of (i) an optical power of the at least one image region and (ii) an optical spectrum of the at least one image region, the at least one image region being within the projection image generated by the projector, and compare substantially synchronously the at least one image region of the projection image with a corresponding respective image region of the at least one observation shot,
        calculate a variable derived from comparisons between respective image regions, and calculate a control signal derived from the calculated variable, and
        output the derived control signal to a focusing device of the projector.

2. The device as claimed in claim 1, wherein exactly one image region of the projection image is defined for modulation of a time period with respect to at least one of (i) optical power of the projection image and (ii) an optical spectrum of the projection image, and for the substantially synchronous comparison of the at least one image region of the observation shot; and wherein the variable derived from a comparison of the respective image regions corresponds to a signal-to-noise ratio.

3. The device as claimed in claim 1, wherein a plurality of image regions of the projection image is defined for respective modulation of a time period with respect to at least one of (i) an optical power of the plurality of image regions and an optical spectrum of the plurality of image regions, and for the substantially synchronous comparison of the image region of the observation shot which corresponds to the respective image region of the projection image with the respective image region of the projection image.

4. The device as claimed in claim 3, wherein each of the at least two image regions of the projection image are proximally located.

5. The device as claimed in claim 3, wherein a respective image region is modulated with a respective identical waveform; and wherein a phase shift is provided in a modulation of a second image region with respect to a first image region.

6. The device as claimed in claim 4, wherein a respective image region is modulated with a respective identical waveform; and wherein a phase shift is provided in a modulation of a second image region with respect to a first image region.

7. The device as claimed in claim 5, wherein the phase shift is equal to a value of $\pi$.

8. The device as claimed in claim 7, wherein a variable derived from the comparison of the respective image regions is calculated; and wherein the optical power of the first image region and the second image region are each spatially integrated and an integrated optical power of the first image region is subtracted from an integrated optical power of the second image region.

9. The device as claimed in claim 2, wherein the modulation occurs with a frequency that is above a sampling frequency of the projector.

10. The device as claimed in claim 3, wherein the modulation occurs with a frequency of over 70 Hertz.

11. The device as claimed in claim 1, further comprising:
    a device for performing intensity normalisations to adjust an intensity of modulated image regions within a reference range.

12. The device as claimed in claim 1, wherein further comprising:
    a device for performing intensity normalisations;
    wherein a measured value for the optical power of the at least one image region is evaluated during a non-modulated phase.

13. The device as claimed in claim 1, further comprising:
    a device for performing intensity normalisations;
    wherein a peak value for the optical power of the at least one image region is evaluated during a modulated phase.

14. The device as claimed in claim 1, further comprising:
    a device for intensity normalisations;
    wherein spatially limited regions having at least one of a structure and optical power which is substantially similar to a modulated image region are evaluated.

15. A method for optically focusing a projection image projected by a projector, comprising:
    controlling, by a detector, creation of at least one observation shot of the projection image over a time period;

defining, by a calculating unit, at least one image region modulated over the time period with respect to at least one of (i) an optical power of the at least one image region and (ii) an optical spectrum of the at least one image region, the at least one image region being within the projection image generated by the projector;

comparing, by the calculating unit, substantially synchronously the at least one image region of the projection image and a corresponding respective image region of an observation shot;

calculating, by the calculating unit, a variable derived from comparisons of respective image regions and a control signal derived from the derived variable; and outputting, from the calculating unit, the control signal to a focusing device of the projector.

* * * * *